(12) United States Patent
Ryu

(10) Patent No.: US 8,103,276 B2
(45) Date of Patent: Jan. 24, 2012

(54) METHOD OF CONTROLLING IDLE MODE INITIATION OF A MOBILE STATION IN A BROADBAND WIRELESS ACCESS SYSTEM

(75) Inventor: Ki Seon Ryu, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 986 days.

(21) Appl. No.: 11/758,290

(22) Filed: Jun. 5, 2007

(65) Prior Publication Data

US 2007/0298725 A1    Dec. 27, 2007

(30) Foreign Application Priority Data

Jun. 5, 2006 (KR) ........................ 10-2006-0050530

(51) Int. Cl.
*H04W 4/00* (2009.01)

(52) U.S. Cl. .................. 455/435.1; 455/574; 455/522; 455/68; 370/311

(58) Field of Classification Search ........... 455/572–574
See application file for complete search history.

(56) References Cited

U.S. PATENT DOCUMENTS

| | | | |
|---|---|---|---|
| 6,243,579 B1 | 6/2001 | Kari | |
| 7,519,017 B2 * | 4/2009 | Yi | ................................ 370/318 |
| 2004/0038707 A1 | 2/2004 | Kim | |
| 2005/0047386 A1 | 3/2005 | Yi | |
| 2006/0009242 A1 | 1/2006 | Ryu et al. | |
| 2006/0040656 A1 * | 2/2006 | Kotzin | ........................ 455/426.2 |
| 2006/0084453 A1 | 4/2006 | Kim et al. | |
| 2007/0224986 A1 * | 9/2007 | Bakshi et al. | ................. 455/436 |

FOREIGN PATENT DOCUMENTS

| | | |
|---|---|---|
| JP | 2006515491 | 5/2006 |
| KR | 10-0665426 | 1/2007 |
| WO | 2005120178 | 12/2005 |
| WO | 2006001674 | 1/2006 |
| WO | 2006016766 | 2/2006 |
| WO | 2006/038781 | 4/2006 |
| WO | 2006/101370 | 9/2006 |

OTHER PUBLICATIONS

IEEE Standard for Local and Metropolitan Area Networks, "Part 16: Air Interface for Fixed and Mobile Broadband Wireless Access Systems," IEEE Std 802.16e, pp. 76-82, 261-264, Feb. 2006.

* cited by examiner

*Primary Examiner* — Kamran Afshar
*Assistant Examiner* — Sayed T Zewari
(74) *Attorney, Agent, or Firm* — Lee, Hong, Degerman, Kang & Waimey

(57) ABSTRACT

A method of controlling entry into an idle mode in a wireless communication system is disclosed. More specifically, the method includes receiving from a base station (BS) a first message including a first action code, wherein the first action code requests a mobile station (MS) to de-register from the BS and initiate idle mode, and if the MS has pending uplink data, transmitting a second message including a second action code, wherein the second action code rejects the request from the BS.

19 Claims, 5 Drawing Sheets

———— 1st Paging Group ————
············· 2nd Paging Group ·············
——— — —— 3rd Paging Group ——— — ——
———————— 4th Paging Group ————————

= Cell covered by 6 BSs

------- 1st Paging Group -------
············· 2nd Paging Group ·············
——  — —— 3rd Paging Group ——  — ——
———————— 4th Paging Group ————————

=Cell covered by 6 BSs

METHOD OF CONTROLLING IDLE MODE INITIATION OF A MOBILE STATION IN A BROADBAND WIRELESS ACCESS SYSTEM

This application claims the benefit of Korean Application No. P2006-050530, filed on Jun. 5, 2006, which is hereby incorporated by reference.

BACKGROUND OF THE INVENTION

1. Field of the Invention

The present invention relates to a broadband wireless access system, and more particularly, to a method of controlling idle mode initiation of a mobile station (MS) in a broadband wireless access system.

2. Discussion of the Related Art

Generally, a broadband wireless access system supports an idle mode to reduce power consumption of a mobile station (MS). In the idle mode, a non-registered MS can periodically check to see if there is any downlink traffic from a base station (BS). The MS can check for downlink traffic by receiving a paging (e.g., MOB_PAG-ADV) message from the BS. The MS can also check while it is moving between BSs within a paging zone, comprising a plurality of BSs, even if handover does not take place.

However, with mobility of the MS and various states or modes the MS can be in, it is important that the MS utilize its resources efficiently. In particular, it is important that the MS efficiently manage its power usage. At the same time, it is important for the MS to effectively perform its functions. That is, it is important for the MS to maintain effective and efficient connection and communication with the BS (or the network).

SUMMARY OF THE INVENTION

Accordingly, the present invention is directed to a method of controlling idle mode initiation of a mobile station (MS) in a broadband wireless access system that substantially obviates one or more problems due to limitations and disadvantages of the related art.

An object of the present invention is to provide a method of controlling entry into an idle mode in a wireless communication system.

Another object of the present invention is to provide a method of controlling entry into an idle mode in a wireless communication system.

A further object of the present invention is to provide a mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling entry into an idle mode in a wireless communication system includes receiving from a base station (BS) a first message including a first action code, wherein the first action code requests a mobile station (MS) to de-register from the BS and initiate idle mode, and if the MS has pending uplink data, transmitting a second message including a second action code, wherein the second action code rejects the request from the BS.

In another aspect of the present invention, a method of controlling entry into an idle mode in a wireless communication system includes transmitting to a mobile station (MS) a first message including a first action code, wherein the first action code requests the MS to initiate idle mode, initiating a timer for maintaining connection information of the MS, receiving a second message from a mobile station (MS) including a second action code, wherein the second action code rejects the request from the BS, and stopping the timer and maintaining the connection information of the MS.

In a further aspect of the present invention, a mobile terminal includes at least one antenna for: receiving from a base station (BS) a first message including a first action code, wherein the first action code requests a mobile station (MS) to de-register from the BS and initiate idle mode, and transmitting a second message including a second action code, wherein the second action code rejects the request from the BS, and a microprocessor for determining whether there is any uplink data to be transmitted to the BS.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
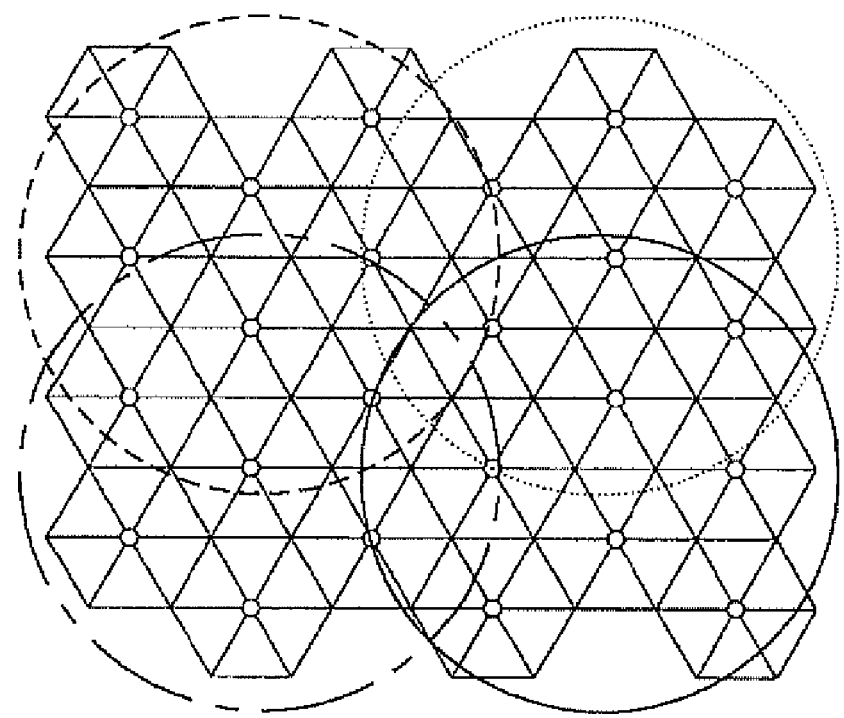
FIG. 1 is an exemplary diagram of a paging zone configured by a paging group comprised of a plurality of base stations supporting an idle mode.
Figure 1:
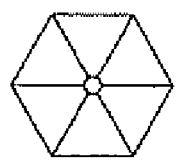

FIG. 1 is an exemplary diagram of a paging zone configured by a paging group comprised of a plurality of base stations supporting an idle mode.

A process associated with a MS entering an idle mode is explained in detail.

In order to enter an idle mode, a MS uses a de-registration request (DREG_REQ) message shown in Table 1. Furthermore, Table 2 is provided to explain a format of 'TLV encoded parameters' field included in Table 1.

TABLE 1

| Syntax | Size | Notes |
| --- | --- | --- |
| DREG-REQ message format | | |
| ( ) { | | |
| Management message type = 49 | 8 bits | |
| De-registration_Request_Code | 8 bits | 0x00 = MS de-registration request from BS and network<br>0x01 = request for MS de-registration from Serving BS and initiation of MS Idle Mode<br>0x02 = Response for the Unsolicited MS De-Registration initiated by the BS.<br>0x03-0xFF = Reserved |
| TLV encoded parameters | Variable | |

TABLE 2

| Name | Type | Length | Value |
| --- | --- | --- | --- |
| Paging Cycle Request | | 2 | Requested cycle in which the paging message is transmitted within the paging group. |
| Idle Mode Retain Information | | 1 | MS request for Paging Controller retention of network re-entry related MAC management message MS service and operational information to expedite future Network Re-entry from Idle Mode. For each Bit location, a value of '0' indicates the information associated with the specified MAC management message is not requested to be retained and managed, a value of '1' indicates the information is requested to be retained and managed.<br>Bit #0: Retain MS service and operation information associated with SBC-REQ/RSP MAC management messages<br>Bit #1: Retain MOS service and operation information associated with PKM_REQ/RSP MAC management messages<br>Bit #2: Retain MS service and operation information associated with REG-REQ/RSP MAC management messages<br>Bit #3: Retain MS service and operation information associated with Network address<br>Bit #4: Retain MS service and operation information associated with Time of Day Acquisition<br>Bit #5: Retain MS service and operation information associated with TFTP MAC management messages<br>Bit #6: Retain MS service and operation information associated with full service (MAC state machines, CS classifier information, etc.) |

A MS can make a request for entering an idle mode by delivering a de-registration request message to a BS. Here, the de-registration request message is represented by a de-registration request code which is set to 0x01. In this case, the MS can deliver to the BS a preferred paging cycle and mobile station management resource information that the BS desires to retain.

The BS having received the de-registration request message can respond to the idle mode initiation request made by the MS via a de-registration command (DREG_CMD) message shown in Table 3.

TABLE 3

| Syntax | Size | Notes |
|---|---|---|
| DREG-CMD Message_Format ( ) { | | |
| Management Message Type = 29 | 8 bits | |
| Action Code | 8 bits | |
| TLV encoded parameters | variable | |
| } | | |

The BS allows the MS to enter an idle mode via an action code of the de-registration command (DREG-CMD) message (Action Code: '05'), makes the MS request an initiation of an idle mode again after predetermined time duration (Action Code" '06'), or prevents the MS from making a request for an initiation of an idle mode until the BS transmits the de-registration command message (Action Code" '07').

Table 4 explains action codes of the re-deregistration command message and MS actions instructed by the respective action codes.

TABLE 4

| Action Code | Action |
|---|---|
| 0x00 | MS shall immediately terminate service with the BS and should attempt network entry at another BS. |
| 0x01 | MS shall listen to the current BS but shall not transmit until an RES-CMD message or DREG-CMD with Action Code '02' or '03' is received. |

TABLE 4-continued

| Action Code | Action |
|---|---|
| 0x02 | MS shall listen to the current BS but only transmit on the Basic and Primary Management Connections. |
| 0x03 | MS shall return to normal operation and may transmit on any of its active connections. |
| 0x04 | MS shall terminate current Normal Operations with the BS; the BS shall transmit this action code only in response to any MS DREG-REQ message. |
| 0x05 | MS shall immediately begin de-registration from serving BS and request initiation of MS Idle Mode. |
| 0x06 | The MS may retransmit the DREG-REQ message after the time duration (REG-duration) provided in the message. |
| 0x07 | The MS shall not retransmit the DREG-REQ message and shall wait the DREG-CMD message. BS transmittal of a subsequent DREG-CMD with Action Code 03 shall cancel this restriction. |
| 0x08 | Reserved |

The BS is able to deliver a paging group ID (Paging Group ID), a paging cycle (Paging_Cycle), and a paging offset value (Paging_Offset), which should be retained by the corresponding MS for an idle mode, via an TLV (type length value) item that can be selectively included in the de-registration command message.

Table 5 shows paging information included as TLV parameter in a de-registration command message, mobile station management resource information retained by a BS after idle mode initiation of a MS, a paging controller ID, and the like. If the MS in the idle mode terminates the idle mode or carries out a location update process, information retained by the BS when the MS initiates the idle mode enables the MS to skip a procedure for acquiring corresponding information in a network registration process. As such, fast network entry and location update of the MS are enabled.

TABLE 5

| Name | Type | Length | Value |
|---|---|---|---|
| Paging information | | 4 | Bits 15:0—PAGING_CYCLE—Cycle in which the paging message is transmitted within the paging group<br>Bits 23:16—PAGING OFFSET—Determines the frame within the cycle in which the paging message is transmitted. Must be smaller than PAGING CYCLE value<br>Bits 31:24 0 Paging-group-ID—ID of the paging group the MS is assigned to |
| REG-duration | | 1 | Waiting value for the DREG-REQ message retransmission (measured in frames) |
| Paging Controller ID | | 6 | This is a logical network identifier for the Serving BS or other network entity retaining MS service and operational information and/or administering paging activity for the MS while in IDLE Mode |

TABLE 5-continued

| Name | Type | Length | Value |
|---|---|---|---|
| Idle Mode Retain Information | | 1 | Idle Mode Retain Information is provided as part of this message is indicative only. Network Re-entry from Idle Mode process requirements may change at time of actual reentry. For each Bit location, a value of '0' indicates the information for the associated reentry management messages shall not be retained and managed.<br>Bit #0: Retain MS service and operation information associated with SBC-REQ/RSP MAC management messages<br>Bit #1: Retain MOS service and operation information associated with PKM_REQ/RSP MAC management messages<br>Bit #2: Retain MS service and operation information associated with REG-REQ/RSP MAC management messages<br>Bit #3: Retain MS service and operation information associated with Network address<br>Bit #4: Retain MS service and operation information associated with Time of Day<br>Bit #5: Retain MS service and operation information associated with TFTP MAC management messages<br>Bit #6: Retain MS service and operation information associated with Full service (MAC state machines, CS classifier information, etc.) |

Subsequently, the MS is able to maintain or terminate the idle mode by receiving a paging broadcast (MOB-PAG-ADV) message shown in Table 6 in a predetermined paging cycle and at a paging offset.

TABLE 6

| Syntax | Size | Notes |
|---|---|---|
| MOB_PAG-ADV Message_Format ( ) { | | |
| Management Message Type = 62 | 8 bits | |
| Num_Paging_Group_IDs | 8 bits | Number of Paging Group IDs in this message |
| For (i=0; i< Num_Paging_Group_IDs; I++) { | | |
| Paging_Group_ID | 8 bits | |
| } | | |
| Num_MACs | 8 bits | Number of MS MAC addresses |
| For (j=0; j<Num_MACs; j++) { | | |
| MS MAC Address hash | 24 bits | The hash is obtained by computing a CRC24 on the MS 48-bit MAC address. The polynomial for the calculation is 0x864CFB. |
| Action Code | 2 bits | Paging action instruction to MS<br>00 = No Action Required<br>01 = Perform Ranging to establish location and acknowledge message<br>10 = Enter Network<br>11 = reserved |
| Reserved | 6 bits | |
| } | | |
| TLV Encoded Information | variable | TLV specific |
| reserved | variable | Padding bits to ensure octet aligned |
| } | | |

Figure 2:
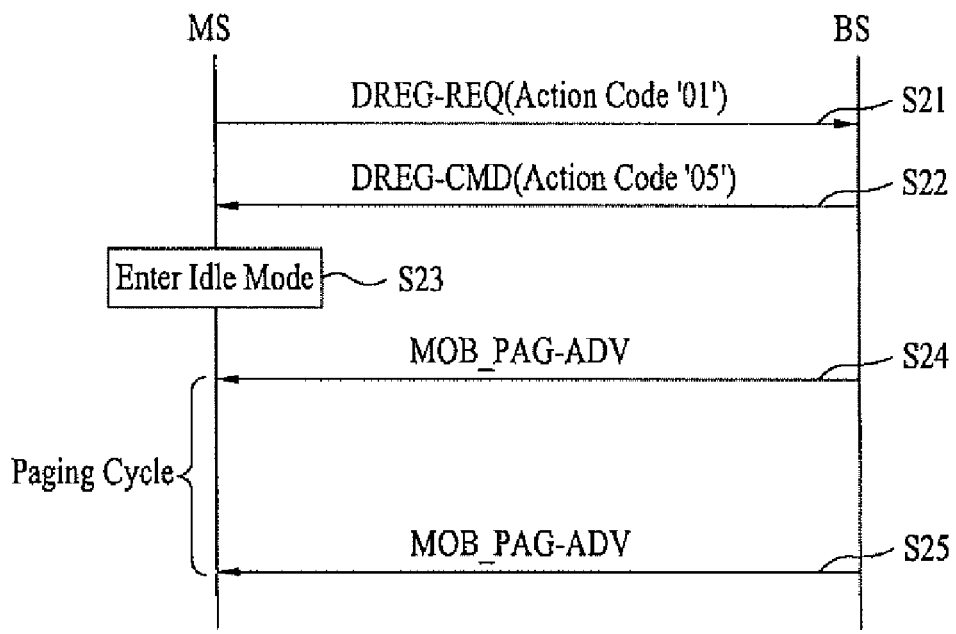
FIG. 2 is a diagram illustrating the procedures associated with idle mode initiation of a MS.

FIG. 2 is a diagram illustrating the procedures associated with idle mode initiation of a MS.

Referring to FIG. 2, the MS requests to initiate or enter idle mode by delivering a de-registration request message DREG-REQ, including an action code set to '01', to the BS [S21].

The BS having received the de-registration request message from the MS can command the MS to initiate or enter idle mode via a de-registration command (DREG-CMD) message [S22]. The DREG-CMD message includes a paging group ID of the BS, a corresponding paging cycle, and a paging offset. Here, an action code of the DREG-CMD message is set to '05'. In case the MS fails to receive the DREG-CMD message, the BS maintains or keeps information (e.g., a connection identifier) associated with the corresponding MS for a predetermined time duration by activating a management resource holding timer.

The MS having received the de-registration command message initiates an idle mode [S23].

However, if uplink or downlink traffic is generated in the course of the idle mode initiation of the MS, the BS may need to reject the idle mode initiation request made by the MS or cancel the idle mode initiation of the MS.

Hereafter, procedures associated with rejecting or cancelling the idle mode initiation will be explained.

Figure 3:
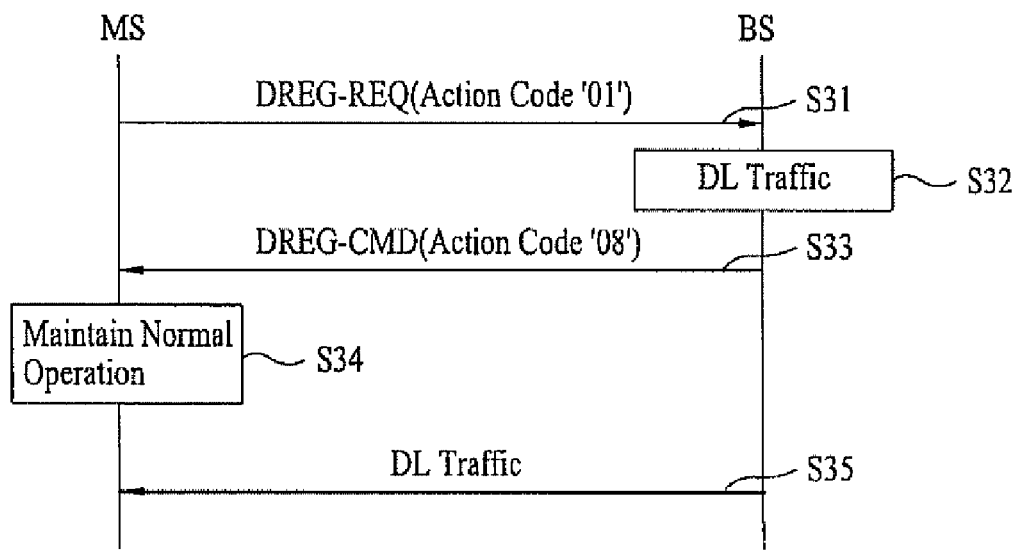
FIG. 3 is an exemplary diagram illustrating rejection of idle mode initiation request by the BS.

FIG. 3 is an exemplary diagram illustrating rejection of idle mode initiation request by the BS. Referring to FIG. 3, the MS can make a request for an initiation of an idle mode by sending a de-registration request (DREG-REQ) message including an action code set to '01' to the BS [S31].

After the BS has received the de-registration request message from the MS, an event arises which can prevent the BS from permitting the MS to enter idle mode. The event can include existence of downlink traffic [S32].

In such a case, the BS can command the MS to maintain a normal operation status by transmitting a de-registration command (DREG-CMD) message having an action code which indicates that the idle mode initiation request is rejected [S33]. The action code, here and hereinafter, can be represented by eight (8) bits.

Table 7 is an example of a newly defined action code included in the de-registration command message. This action code defines the reason for the BS rejecting the idle mode initiation request made by the MS. That is, if the action code included in the de-registration command (DREG-CMD) message to the MS from the BS is set to '08', it means that the BS rejects the idle mode initiation request made by the MS.

TABLE 7

| Action Code | Action |
|---|---|
| 0x08 | MS shall maintain normal operation with the reason why BS rejects MS request of idle mode initiation. |

After receiving the de-registration command message from the BS, rejecting the idle mode initiation request of the MS and further instructing the MS to maintain the normal operation status, the MS maintains the normal operation status [S34]. Thereafter, the BS can perform downlink (DL) traffic transmission to the MS in the normal operation status [S35].

Figure 4:
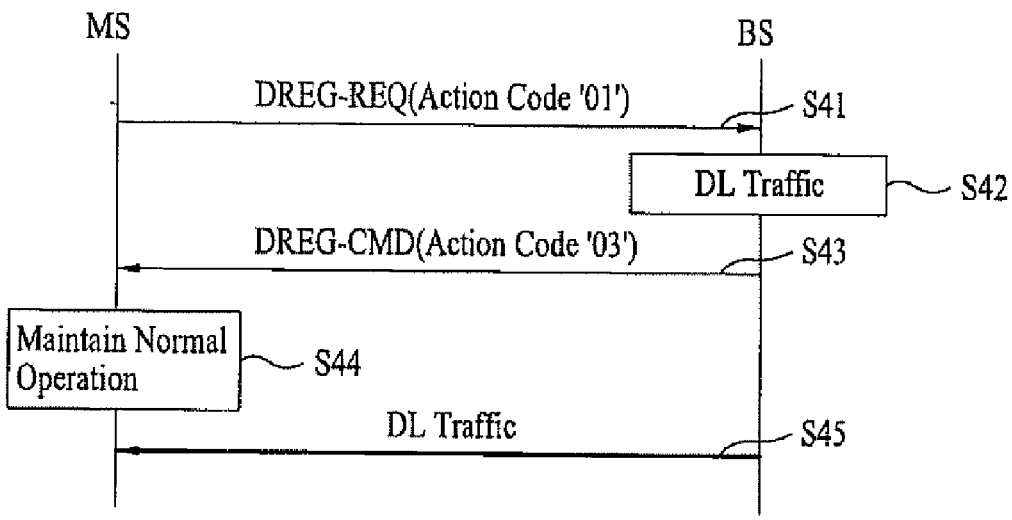
FIG. 4 is another exemplary diagram illustrating rejection of idle mode initiation request by the BS.

FIG. 4 is another exemplary diagram illustrating rejection of idle mode initiation request by the BS. Referring to FIG. 4, the MS can request for an initiation of an idle mode by transmitting a de-registration request (DREG-REQ) message including an action code set to '01' to the BS [S41].

After the base station has received the de-registration request message from the MS but before a reply is sent, a downlink traffic can arise. Therefore, the BS cannot permit the MS to initiate or enter idle mode [S42].

In such a case, the BS can command the MS to maintain a normal operation status by transmitting a de-registration command (DREG-CMD) message having an action code which indicates that the idle mode initiation request is rejected [S43].

Table 8 is an example of a modified action code included in the de-registration command message. This action code defines rejection of the idle mode initiation request made by the MS. That is, if the de-registration command (DREG-CMD) message is transmitted with the action code set to '03', which includes an action code set to '01', in response to a de-registration request message, it means that the BS rejects the idle mode initiation request made by the MS.

TABLE 8

| Action Code | Action |
|---|---|
| 0x03 | MS shall return to normal operation and may transmit on any of its active connections. If this code is transmitted on the response to DREG-REQ with action code 01, it means that |

TABLE 8-continued

| Action Code | Action |
|---|---|
| | BS rejects MS's request of idle mode initiation and MS shall maintain normal operation. |

After receiving the de-registration command message from the BS, rejecting the idle mode initiation request of the MS and further instructing the MS to maintain the normal operation status, the MS maintains the normal operation status [S44]. Thereafter, the BS can perform downlink (DL) traffic transmission to the MS in the normal operation status [S45].

Figure 5:
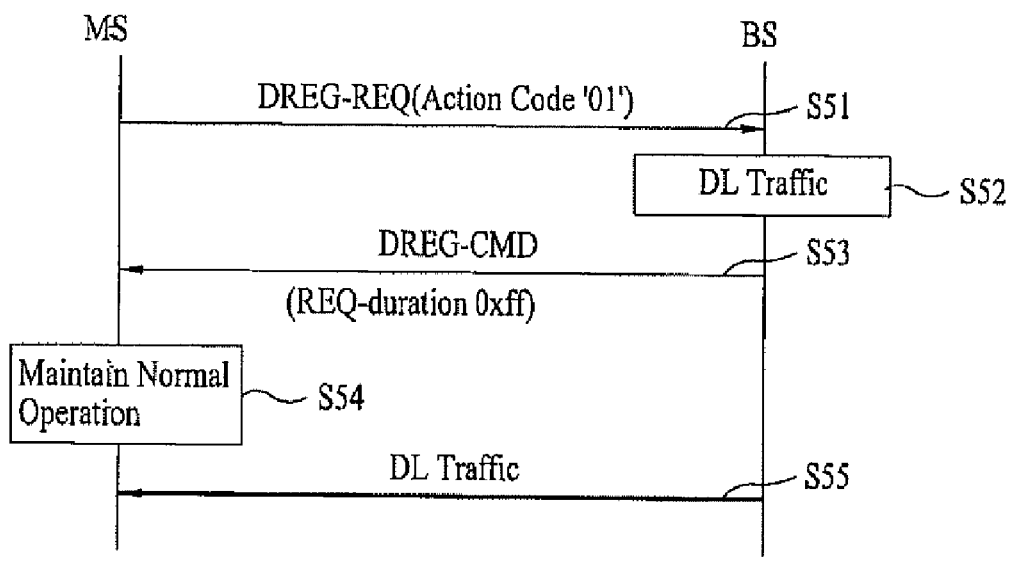
FIG. 5 is another exemplary diagram illustrating rejection of idle mode initiation request by the BS.

FIG. 5 is another exemplary diagram illustrating rejection of idle mode initiation request by the BS. Referring to FIG. 5, the MS can request for an initiation of an idle mode by transmitting a de-registration request (DREG-REQ) message including an action code set to '01' to the BS [S51].

After the BS has received the de-registration request message from the MS, an event can occur which prevents the BS from allowing the MS to initiate or enter idle mode. The event can include existence of downlink traffic which requires the MS to remain in normal operation [S52].

In such a case, the BS can command the MS to maintain a normal operation status by transmitting a de-registration command (DREG-CMD) message including a message parameter, which is shown in Table 9. The parameter included in the message can be used to indicate rejection of the idle mode initiation request [S53].

Table 9 is an example of a message parameter included in the de-registration command message. As discussed, this message parameter can be used to indicate rejection of the idle mode initiation request made by the mobile station.

TABLE 9

| Name | Type | Length | Value |
|---|---|---|---|
| REQ-duration | 2 | 1 | Waiting value for the DREG-REQ message retransmission (measured in frame). The value set to 0xFF indicates that BS rejects MS request of Idle Mode initiation and MS shall maintain normal operation. |

After receiving the de-registration command message from the BS, rejecting the idle mode initiation request of the MS and further instructing the MS to maintain the normal operation status, the MS maintains the normal operation status [S54]. Thereafter, the BS can perform downlink (DL) traffic transmission to the MS in the normal operation status [S55].

Figure 6:
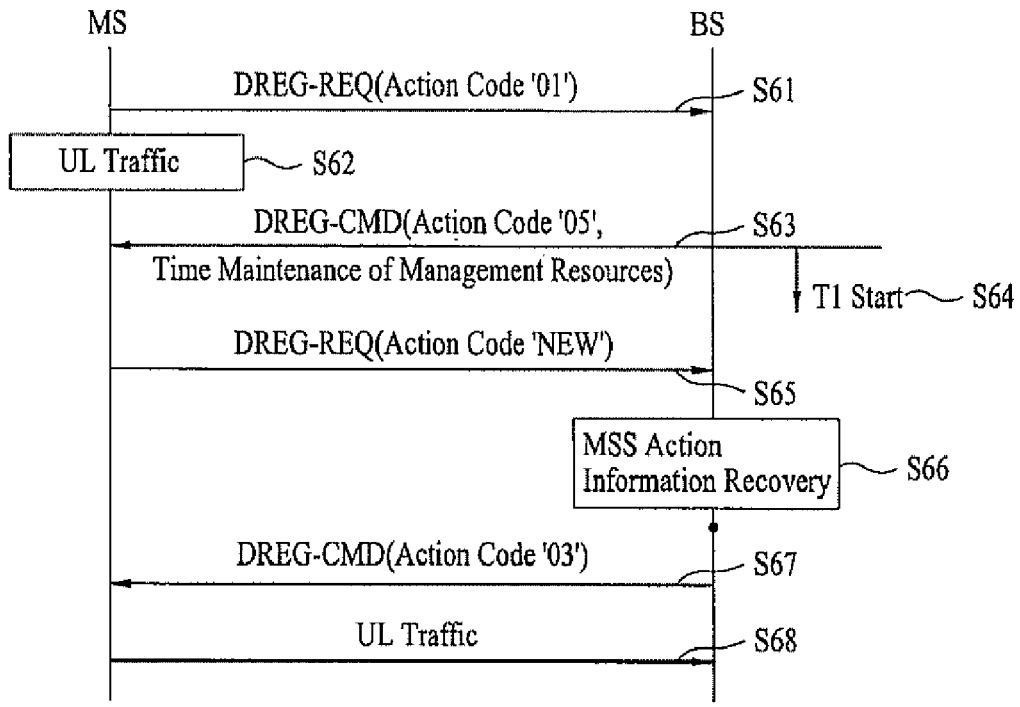
FIG. 6 is an exemplary diagram illustrating canceling of the idle mode initiation request by the MS.

FIG. 6 is an exemplary diagram illustrating canceling of the idle mode initiation request by the MS. Referring to FIG. 6, the MS can request for an initiation of an idle mode by transmitting a de-registration request (DREG-REQ) message including an action code set to '01' to the BS [S61].

After the mobile station has transmitted the de-registration request (DREG-REQ) message to the BS, uplink traffic arises which requires the MS to transmit the uplink traffic [S62].

After the BS has received the de-registration request message, the BS transmits a de-registration command message (Action code '05') commanding (or granting) an idle mode initiation to the corresponding mobile station [S63]. In this case, the BS transmits management resource holding time information, which indicates a time duration the MS should hold (or maintain) without releasing a management source in the course of the idle mode initiation. The BS then activates a timer, T1, for counting the management resource holding time after having transmitted the de-registration command message including the management resource holding time information therein [S64].

Table 10 shows an example of a parameter indicating the management resource holding time information.

TABLE 10

| Name | Type | Length | Value | Scope |
| --- | --- | --- | --- | --- |
| Management Resource Holding Time | TBD | 1 | Time the BS maintain connection information with the MS after the BS send DREG-CMD to the MS. The unit is 10 ms. | DREG-CMD |

After receiving the de-registration command message from the BS, the MS can make a request to the BS to cancel idle mode initiation by transmitting a de-registration request message as shown in Table 11 [S65]. The MS makes this request so that it can send uplink traffic while maintaining in normal operation.

TABLE 11

| Syntax | Size | Notes |
| --- | --- | --- |
| DREG-REQ message_format ( ) { | | |
| Management Message Type = 62 | 8 bits | |
| De-Registration_Request_Code | 8 bits | 0x03 = Cancel for initiation of MS Idle Mode, or reject for the unsolicited MS De-Registration initiated by the BS. |
| TLV encoded parameters } | variable | |

After the BS receives the de-registration request message from the MS requesting to cancel the initiation of the idle mode, the BS recovers (or maintains) operation information for the MS while the management resource of the MS is maintained [S65] and enables the MS to maintain the normal operation status via a de-registration command message for commanding a normal operation initiation of the MS [S67].

After receiving the de-registration command message from the BS, permitting the MS to maintain the normal operation, the MS can perform uplink traffic transmission to the BS [S68].

Figure 7:
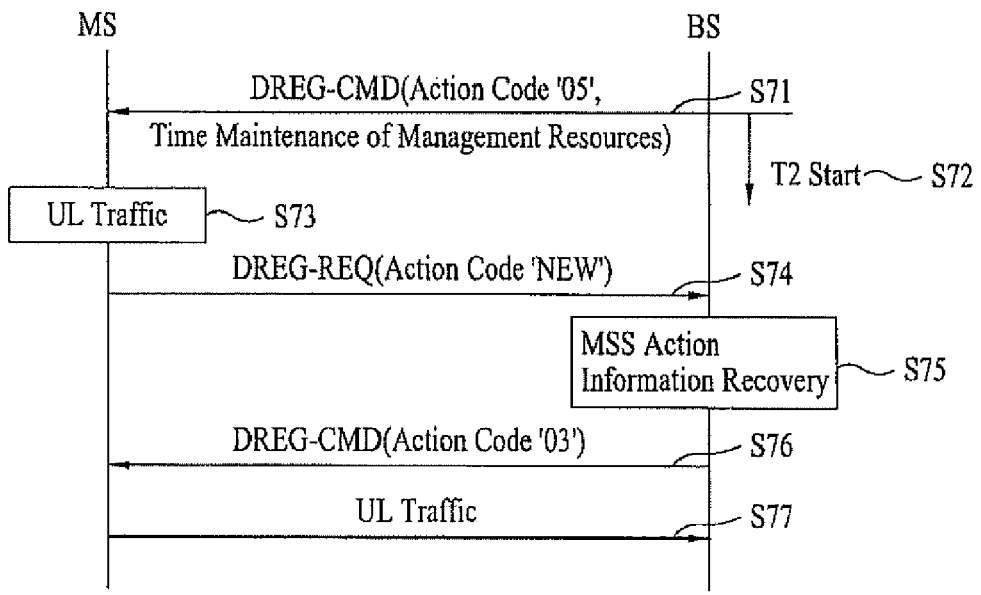
FIG. 7 is an exemplary diagram illustrating the MS rejecting an idle mode initiation command from the BS.

FIG. 7 is an exemplary diagram illustrating the MS rejecting an idle mode initiation command from the BS. Referring to FIG. 7, the BS can command or instruct the MS to initiate or enter idle mode via a de-registration command (DREG-CMD) message [s71]. The DREG-CMD message can include an action code set to '05'. Here, the DREG-CMD is an unsolicited message. Furthermore, the BS can provide time information for holding or maintaining the management resource of the MS in the course of the idle mode initiation shown in Table 10. The BS then activates a timer, T2, for counting a management resource holding time of the MS as soon as the de-registration command message is transmitted [S72].

It is possible for uplink traffic to appear or is generated before the MS initiates the idle mode [S73]. In such a case, the MS transmits a de-registration request (DREG-REQ) message, as shown in Table 11, to the BS to inform of an idle mode initiation rejection [S74].

After the BS receives the de-registration request message from the MS rejecting the initiation of the idle mode, the BS recovers (or maintains) operation information for the MS while the management resource of the MS is maintained [S75]. Here, although the BS maintains the operation information, it can also be interpret as recovering the operation information since the BS can be seen as changing a state, for example.

After receiving the de-registration request message from the MS indicating the idle mode initiation rejection, the BS can enable or permit the MS to maintain the normal operation status via a de-registration command (DREG-CMD) message. Here, the DREG-CMD message can include, for example, an action code set to '03' indicating that the MS return to normal operation. [S76]

After sending the de-registration request message to the BS, indicating the idle mode initiation rejection, the MS can perform uplink traffic transmission to the BS [S77].

Figure 8:
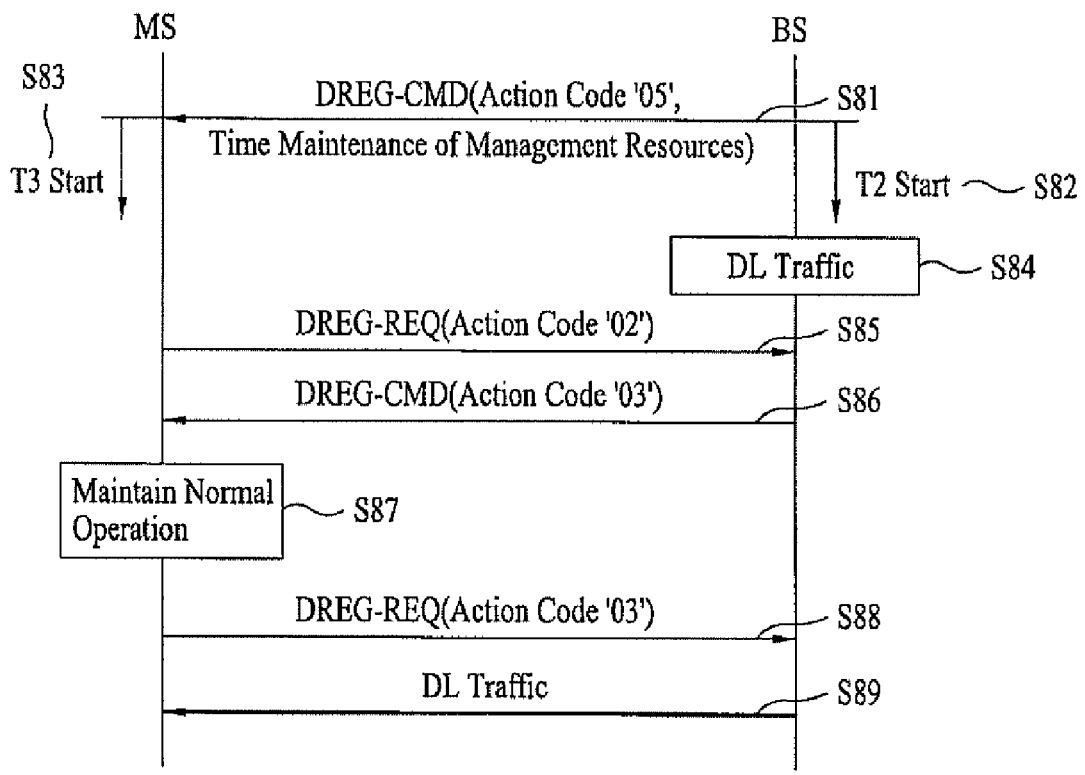
FIG. 8 is another exemplary diagram illustrating the MS rejecting an idle mode initiation command from the BS.

FIG. 8 is another exemplary diagram illustrating the MS rejecting an idle mode initiation command from the BS. Referring to FIG. 8, the BS can request or order the MS to initiate or enter idle mode via a de-registration request (DREG-CMD) message. The DREG-CDM message can include an action code set to '05' [S81]. Here, the DREG-CMD is an unsolicited message. Furthermore, the BS provides time information for holding or maintaining the management resource of the MS in the course of the idle mode initiation shown in Table 10. The BS then activates a timer, T2, for counting a management resource holding time of the MS as soon as the de-registration command message is transmitted [S82].

After the MS receives the de-registration command message including the time information for holding the management resource from the base station, the MS can activate a timer, T3, for counting the management resource holding time [S3].

However, after transmitting the DREG-CMD message to the MS and activating T2 and before T3 expires, it is possible that BS may have data to send to the MS. In other words, it is possible for downlink traffic to arise at this time [S84].

In the meantime, the MS can send a de-registration request (DREG-REQ) message including an action code (e.g., '02') indicating that the DREG-CMD message was successfully received [S85].

However, despite the DREG-REQ message with action code of '02', since the BS has downlink traffic to dispose of, the BS can enable the MS to initiate a normal operation mode (or maintain normal operation mode) by transmitting a de-registration command (DREG-CMD) message including an action code set to '03'. The action code of '03' indicates a normal operation initiation of the mobile station [S86].

After receiving the de-registration command message including the action code set to indicate the normal operation initiation from the base station, the MS can initiate (or maintain) the normal operation status [S87] and then transmit to the BS a de-registration request (DREG-REQ) message having an action code (e.g., '03') set to indicate initiation or maintenance of the normal operation [S88].

Upon receipt of the DREQ-REQ message indicating the completion of the normal operation initiation from the MS, the BS can perform downlink traffic transmission to the MS [S89].

Yet, in the embodiment shown in FIG. 8, as mentioned in the foregoing description, in case that the base station attempts to cancel the command for the idle mode initiation of the MS without delivering the management resource holding timer setting information for the MS to the MS via the de-registration command message, the BS can transmit a de-registration command message including an action code indicating an idle mode initiation to the MS before receiving a de-registration request message delivered for a usage of acknowledgement for the de-registration command message reception from the MS.

In this case, the MS can receive the de-registration command message having the action code set to indicate the idle mode initiation command and the de-registration command message having the action code set to indicate the idle mode initiation cancellation and transmit the de-registration request message having the action code set to indicate the idle mode cancellation to the base station. Thus, the MS can inform the BS that the normal operation status is maintained without initiating the idle mode. Having received the de-registration request message including the action code indicating the idle mode cancellation from the MS, the BS can transmit downlink traffic to the MS.

Accordingly, the present invention provides a method for the BS rejecting an idle mode initiation request made by the MS, and a method of canceling an idle mode initiation of the MS, thereby enabling the MS to immediately initiate a normal operation status if a normal operation initiation is necessary due to uplink/downlink traffic generation in the course of an idle mode initiating process of the MS.

Figure 9:
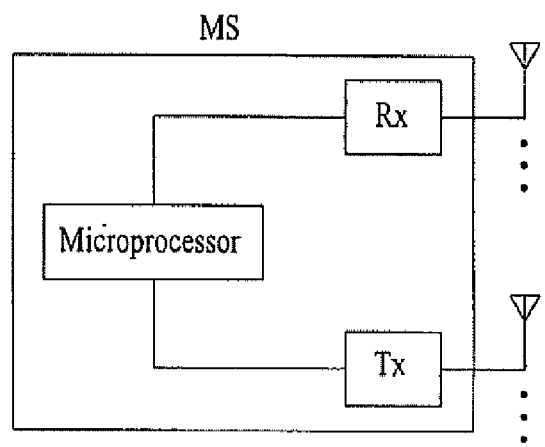
FIG. 9 is an exemplary diagram of a mobile station.

Further, FIG. 9 is an exemplary diagram of a mobile station. Referring to FIG. 9, the MS has at least one antenna and at least one microprocessor. The at least one antenna can be used to receive a de-registration command (DREG-CMD) message from the BS. The DREG-CMD message can include an action code (e.g., set to '05') which indicates to the MS to de-register from the BS and initiate idle mode.

As discussed, after receiving the DREG-CMD message from the BS, uplink traffic can arise which prevents the MS from entering idle mode. As such, a microprocessor in the MS can determine whether there is any uplink traffic for the BS. If not, the MS can enter the idle mode. If so, then the MS can send a de-registration request (DREG-REQ) message via the at least one antenna to the BS rejecting the command by the BS to initiate idle mode. In the DREG-REQ message, an action code can be provided to indicate that the MS cannot initiate idle mode.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling an idle mode entry of a mobile station (MS) in a wireless communication system, the method comprising:
receiving, by the MS, a message including a first action code from a base station (BS), wherein the first action code orders that the MS initiate idle mode;
transmitting, by the MS in response to the message including the first action code, a message including a second action code to the BS when the MS has uplink data to transmit, in order to maintain normal operation, wherein the second action code rejects the order that the MS initiate idle mode;
transmitting, by the MS in response to the message including the first action code, a message including a third action code to the BS when the MS is ready to enter idle mode, wherein the third action code requests that the BS de-register the MS from the BS;
receiving, by the MS, a message including a fourth action code from the BS in response to the message including the third action code, wherein the fourth action code indicates that the MS is to maintain normal operation; and
maintaining normal operation according to the message including the fourth action code.

2. The method of claim 1, further comprising:
transmitting, by the MS, the uplink data to the BS upon transmitting the message including the second action code.

3. The method of claim 1, further comprising:
receiving, by the MS, downlink data from the BS upon receiving the message including the fourth action code.

4. The method of claim 1, wherein the message including the first action code is an unsolicited message.

5. The method of claim 1, wherein the message including the first action code further includes a time period for retransmission of the message including the second action code.

6. The method of claim 1,
wherein the message including the first action code is a de-registration command (DREG-CDM) message, and
wherein the message including the second action code is a de-registration request (DREG-REQ) message.

7. The method of claim 1, wherein the message including the first action code further includes a parameter.

8. A method of controlling an idle mode entry of a mobile station (MS) in a wireless communication system, the method comprising:
transmitting, by a base station (BS) to the MS, a message including a first action code, wherein the first action code orders that the MS initiate idle mode;
receiving, by the BS, a message from the MS in response to the message including the first action code;
maintaining connection information of the MS if the message from the MS includes a second action code, wherein the second action code rejects the order that the MS initiate idle mode; and
if the message from the MS includes a third action code requesting that the BS de-register the MS from the BS, transmitting, by the BS to the MS, a message including a fourth action code and maintaining the connection information of the MS upon rejecting the request that the BS de-register the MS, wherein the fourth action code indicates that the MS is to maintain normal operation.

9. The method of claim 8, further comprising:
receiving uplink data from the MS if the message from the MS included the second action code.

10. The method of claim 8, further comprising:
transmitting, by the BS to the MS, downlink data upon transmitting the message including the fourth action code.

11. The method of claim 8,
wherein the message including the first action code is a de-registration command (DREG-CDM) message, and
wherein the message including the second action code is a de-registration request (DREG-REQ) message.

12. A mobile station (MS) comprising:
a microprocessor; and
at least one antenna configured to receive from a base station (BS) a message including a first action code, wherein the first action code orders that the MS initiate idle mode,
wherein the at least one antenna is further configured to transmit, when the microprocessor determines that uplink data is to be transmitted, a message including a second action code to the BS in response to the message including the first action code, in order to maintain normal operation, wherein the second action code rejects the order that the MS initiate idle mode;
wherein the at least one antenna is further configured to transmit, when the microprocessor determines that there is no uplink data to be transmitted, a message including a third action code to the BS in response to the first message including the first action code, wherein the third action code requests that the BS de-register the MS from the BS;
wherein the at least one antenna is further configured to receive from the BS a message including a fourth action code in response to the message including the third action code, wherein the fourth action code indicates that the MS is to maintain normal operation; and
wherein the microprocessor is configured to maintain the normal operation in response to the receipt of the message including the fourth action code.

13. The mobile station (MS) of claim 12, wherein the at least one antenna is further configured to transmit the uplink data to the BS upon transmitting the message including the second action code.

14. The mobile station (MS) of claim 12,
wherein the message including the first action code is a de-registration command (DREG-CDM) message, and
wherein the message including the second action code is a de-registration request (DREG-REQ) message.

15. The method of claim 8, wherein the message including the first action code further includes a time period for retransmission of the message including the second action code.

16. The method of claim 8, wherein the message including the first action code is an unsolicited message.

17. The mobile station (MS) of claim 12, wherein the at least one antenna is further configured to transmit the uplink data to the BS upon transmitting the message including the second action code.

18. The mobile station (MS) of claim 12, wherein the at least one antenna is further configured to receive downlink data from the BS upon receiving the message including the fourth action code.

19. The mobile station (MS) of claim 12, wherein the message including the first action code is an unsolicited message.

* * * * *